April 26, 1960
J. E. LISINSKI
2,933,931
INTERMITTENT DRIVE MECHANISM
Filed Dec. 30, 1958
2 Sheets-Sheet 1
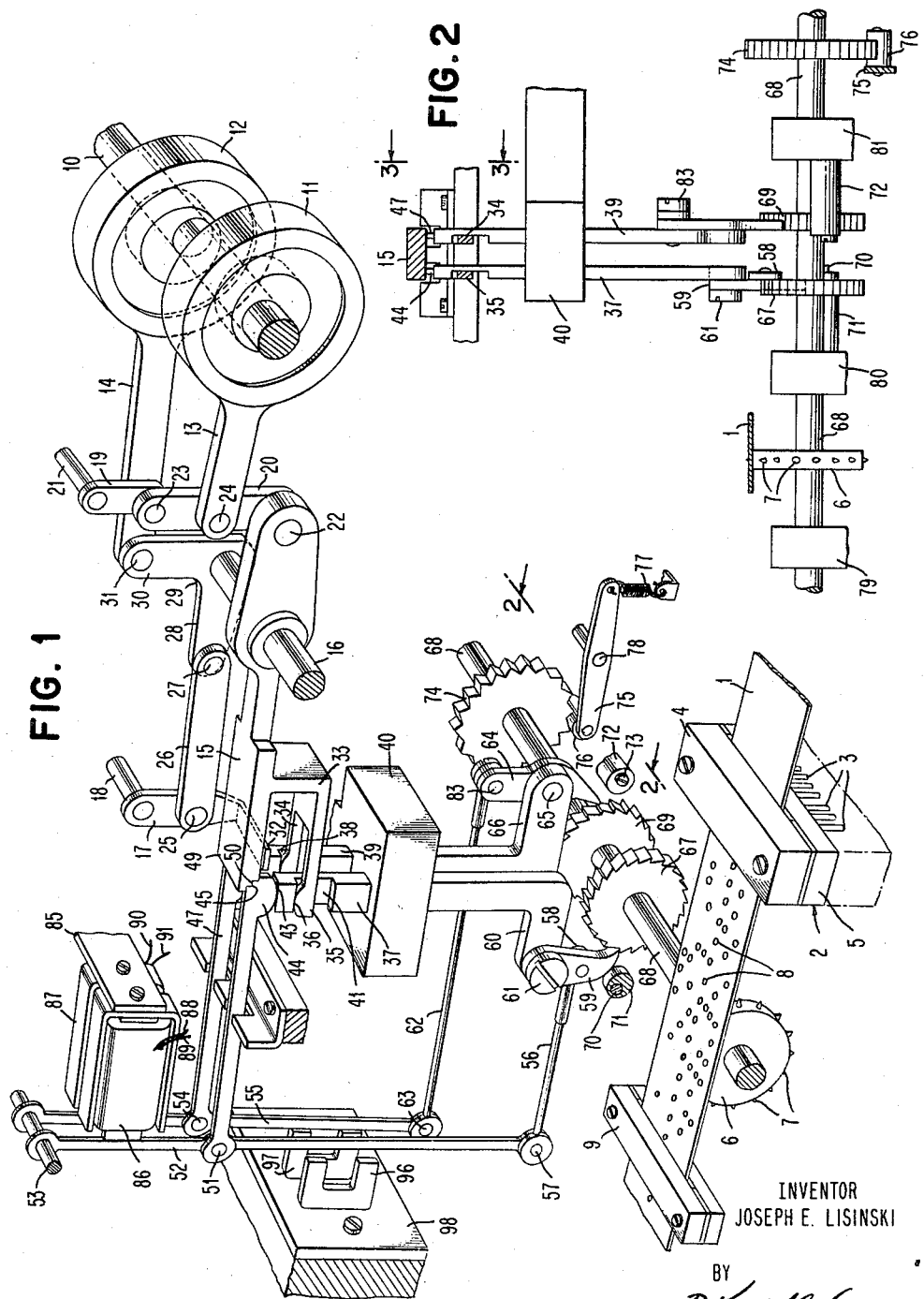
INVENTOR
JOSEPH E. LISINSKI
BY
D. Kendall Cooper
ATTORNEY April 26, 1960   J. E. LISINSKI   2,933,931
INTERMITTENT DRIVE MECHANISM
Filed Dec. 30, 1958   2 Sheets-Sheet 2

United States Patent Office 2,933,931
Patented Apr. 26, 1960

2,933,931

INTERMITTENT DRIVE MECHANISM

Joseph E. Lisinski, Poughkeepsie, N.Y., assignor to International Business Machines Corporation, New York, N.Y., a corporation of New York Application December 30, 1958, Serial No. 783,883

3 Claims. (Cl. 74—144)

This invention relates in general to intermittent drive mechanisms and more particularly to an intermittent drive mechanism which is capable of high speed operation in either the forward or the reverse direction.

The invention has particular usefulness in telegraphic devices which read or punch paper tape at high speeds, but the principles of the invention may be advantageously employed in any device which requires the incremental movement of an element in a forward or in a reverse direction at a high rate of speed.

Certain devices have been proposed in the prior art for accomplishing intermittent movement or escapement of a driven element in a forward direction or in a reverse direction. Generally, these mechanisms have operated satisfactorily at the slow speeds for which they were intended, such as, for example, 20 tape columns per second. However, prior art mechanisms, in general, prove to be unsuitable at high operational speeds, for example, 150 tape columns per second. There are various reasons for this. Among them are: excessive bulk, which makes them incapable of high speed movement; complexity of operation, which requires more time for setting up the mechanism and actuating the mechanism; excessive dependency upon the oscillatory, slower speed characteristics of spring elements; and the existence of certain design features, such as particular types of linkages, or clutches, which do not lend themselves readily to high speed operation. The present invention has been developed for higher speed operation and overcomes these disadvantages of prior art mechanisms in a novel manner.

In its preferred form, the invention contemplates an intermittent drive mechanism which is capable of forward or reverse operation and in which a constantly operating driving member may be selectively connected to forward escapement elements or to reverse escapement elements by electromagnetically actuated interposer means.

A second form of the invention contemplates an intermittent drive mechanism generally like the preferred embodiment, but wherein at least one intermediate drive element is common to both the forward escapement elements and to the reverse escapement elements.

An object of the invention is to provide an intermittent drive mechanism which is capable of forward or reverse operation at high rates of speed.

Another object of the invention is to provide an intermittent drive mechanism capable of rapid forward and reverse operation in which a single driving means may be selectively connected to forward or reverse elements at high rates of speed.

A further object of the invention is to provide such a mechanism wherein both forward and reverse operations may be accomplished through at least one intermediate common element.

Still another object of the invention is to provide a forward and reverse drive mechanism which is simple and efficient in operation and in which wasteful harmonic forces are minimized.

Other objects of the invention will be pointed out in the following description and claims and illustrated in the accompanying drawings, which disclose, by way of example, the principle of the invention and the best mode which has been contemplated of applying that principle.

In the drawings:

Fig. 1 is a detailed perspective view of the preferred embodiment of the invention.

Fig. 2 is a cross sectional view, substantially on the line 2—2 of Fig. 1.

*Description*

Figure 4:
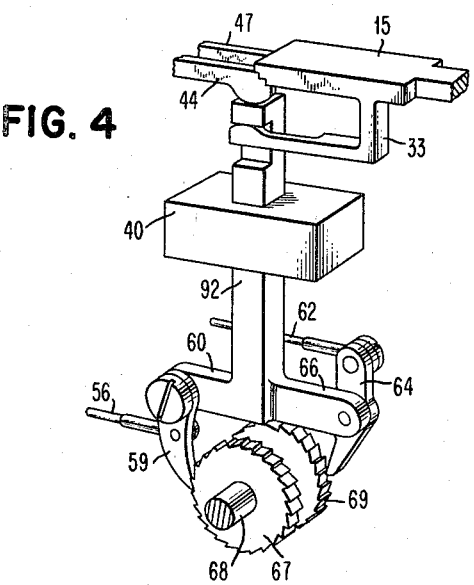
Fig. 4 is a partial view of a second embodiment of the invention.

The preferred embodiment of the invention will be described and its operation will be discussed in conjunction with its use in a high speed telegraphic paper tape punch.

Referring now to Fig. 1 of the drawings, a section of "IBM 8-channel" tape 1 is shown being fed from right to left through a punching station 2 which comprises punches 3, a die 4, and a stripper 5. It is at this point that various combinations of perforations, which represent numbers, alphabetic characters, and special characters, are entered in the tape 1 by means of actuation of the punches 3, in a manner well known in the telegraphic art. Means for causing selective actuation of the punches 3 are not shown in Fig. 1 for reasons of simplicity and because they are not needed for a complete understanding of the operation of the present invention.

The tape 1 is represented as being engaged in its path to the left of the punching station with a pin feed wheel 6 having pins 7 which engage feed holes 8 in the tape 1. Because of the aforementioned engagement, rotation of the pin feed wheel 6 in a clockwise or in a counter-clockwise direction will cause feeding of the tape 1 from left to right or from right to left, respectively. The punching station 2 would ordinarily be situated in closer proximity to the pin feed wheel 6 to prevent tape buckling on reversing but is shown some distance away in Fig. 1 for reasons of clarity. Normal distance between punching station 2 and pin feed wheel 6 might be, for example, five tape columns.

In the system to be described, normal movement of the tape 1 is through the punching station 2, and through a tape guide 9, or in a right to left direction, which will be considered the "forward" direction. Left to right movement of the tape 1, or "reverse" movement, will occur, for purposes of illustration, only when it is desired to back the tape up in order to delete or "punch out" incorrectly punched columns in the tape 1.

Pin feed wheel 6 is fixedly mounted on an escapement shaft 68 through which the wheel 6 is caused to rotate in a clockwise or counter-clockwise manner in order to accomplish forward or reverse movement of the tape 1. The driving force necessary to cause forward or reverse rotation of the shaft 9 is provided from a drive shaft 10 on which eccentric drive elements 11 and 12 are mounted and is selectively transmitted through other intermediately located elements to cause rotation of feed wheel 6 in a manner hereinafter described.

The drive shaft 10 may be continuously rotated by any suitable means, such as a motor, not shown. Because of the eccentric mounting of elements 11 and 12, rotation of the drive shaft 10 will cause the arms 13 and 14 to reciprocate in a generally horizontal plane.

Mounted at some distance from eccentrics 11 and 12, is a drive bail 15, which is free to rock on a shaft 16 and an interposer knockoff 17, which is pivotally mounted on a shaft 18. In the preferred embodiment, the drive bail 15 and the interposer knockoff 17 are actuated twice during each cycle of rotation of the drive shaft 10 due to the reciprocal movements of the arm 13 and the arm 14, respectively.

Double actuation of the bail 15 is accomplished by means of a toggle linkage, which comprises link 19 and link 20. Link 19 is pivotally mounted on a fixed shaft 21. One end of link 20 is pivotally attached to bail 15 by means of a stud 22, and the other end of link 20 is pivotally attached to link 19 by means of a stud 23. Arm 13 of eccentric 11 is attached to link 20 by means of stud 24. The various elements are arranged so that pivot point 23 of the toggle link will pass to the left and to the right of a central reference line drawn from the center of shaft 21 through the center of pivot stud 23, and through the center of stud 22, when the toggle link is in a straightened condition. This may be accomplished by selecting the proper length for arm 13 of eccentric 11. Rotation of shaft 10 and a consequent movement of arm 13 of eccentric 11 will cause pivot stud 23 to move to an extreme left position and to an extreme right position with respect to the aforementioned central reference line. This, in effect, results in a shortening of the toggle link, comprising links 19 and 20, and this also results in the upward movement of the right end of the bail 15, each time stud 23 reaches an extreme position, with a corresponding downward movement of the left end of the bail 15, since the bail 15 is centrally pivoted on shaft 16.

Similarly, each time the toggle link assumes a straightened position, that is when the pivot stud 23 passes through the central reference line, the right end of the bail 15 will move downwardly, and the left end of the bail 15 will move in an upward direction. It can be readily visualized that the toggle link assumes a collapsed condition twice and that it assumes a straightened condition twice during each cycle of rotation of the drive shaft 10 as a result of the movement of arm 13 of eccentric 11. This doubling action results in two upward and two downward movements of the left end of the bail 15 during each cycle of the drive shaft 10.

A similar doubling action takes place with respect to the operation of the interposer knockoff 17. Pivotally attached to interposer knockoff 17 by a stud 25 is one end of a link 26, the other end of which is connected by means of a stud 27 to the secondary arm 28 of a bell crank 29, which is also pivotally mounted on shaft 16. Arm 14 of eccentric 12 is attached to the primary arm 30 of the bell crank 29 by means of a stud 31. These elements are arranged so that the secondary arm 28 of bell crank 29 and the link 26 form, in effect, a toggle link similar to that previously discussed. With the elements so arranged, the pivot stud 27 will pass back and forth through a central reference line which may be visualized as being drawn from the center of stud 25, through the center of stud 27 and through the center of shaft 16. Thus, in a manner similar to that previously described and as a result of the movement of eccentric arm 14, and the straightening and collapsing action of link 26 and secondary arm 28 of bell crank 29, a doubling action will be achieved so that extension 32 of interposer knockoff 17 will reciprocate twice during each rotation of the drive shaft 10.

Extending down from bail 15 is a right angle arm 33 which has two finger-like extensions 34 and 35. Finger 35 projects near the top wall 36 of a cut out portion 41 of a "forward" escapement rod 37. In a similar manner, finger 34 projects into a cut out portion 38 of a "reverse" escapement rod 39. Rods 37 and 39 are maintained in a spaced relationship by means of a guide block 40, and each rod is free to move upwardly and downwardly in an associated guide channel in the guide block 40. The guide block 40 is fixedly mounted to provide proper support for the rods 37 and 39.

Figure 3:
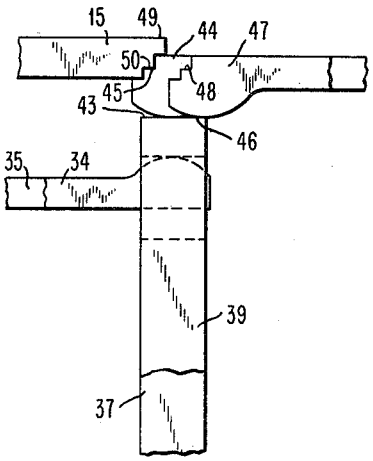
Fig. 3 is a closeup view of selected elements of the preferred embodiment on the line 3—3 in Fig. 2.

Reference is made to Fig. 1 and to Fig. 3, which is a view of certain elements of the mechanism from a direction opposite to that of Fig. 1. Movably positioned on the top 43 of rod 37 in an interposer 44 which has a step-like cut out portion 45 and movably positioned on the top 46 of rod 39 is a similar interposer 47 which has a similar cut out portion 48.

In Fig. 1, a driving end 49 is provided on bail 15. The driving end 49 has a step-like cut out portion 50 which is complementary to the step-like cut out portions 45 and 48 of interposers 44 and 47, respectively. The driving end 49 of the bail 15 is wide enough, front to back, so that the steps 50 may be engaged with steps 45 if interposer 44 has been selected or so that the steps 50 may be engaged with the steps 48 if interposer 47 has been selected. Ordinarily, interposer 44 and interposer 47 are in a restored position, that is, neither interposer is in an engageable relation with the steps 50 of bail 15. As shown in Fig. 1 and Fig. 3 however, "forward" interposer 44 has been positioned so that the steps 45 may engage with the steps 50 on bail 15 and if drive shaft 10 were rotated, a forward escapement would be accomplished in a manner to be described. In Fig. 3, "reverse" interposer 47 is shown to be in a restored or disengaged position with respect to the stepped portion 50 of bail 15. Interlocks are preferably provided in any machine in which the present invention is employed so that interposer 44 and interposer 47 would never be in an engageable position with respect to bail 15 at the same time. Thus, either one or the other would be selectively positioned in order to accomplish a forward or reverse movement of the tape 1, but not both at the same time.

If forward interposer 44 has been positioned into engagement with bail 15 as shown in Fig. 1, a downward movement of the driving end 49 of bail 15 will cause forward escapement rod 37 to move downwardly in the guide block 40. Restoration of the forward escapement rod 37 to its extreme upper limit of travel is accomplished by the bail finger 35 when the left end of bail 15 moves upwardly after the forward escapement has occurred. Bail finger 35 is closely positioned near the step 36 of the cut out portion 84 of rod 37 and movement of the finger 35 upwardly will necessarily cause the rod 37 to move upwardly. Reverse escapement rod 39 is restored in a similar manner by the upward movement of bail finger 34, after the occurrence of a reverse escapement.

Forward interposer 44 is pivotally attached by a stud 51 to an armature 52, which is pivotally mounted on shaft 53. In like manner, the left end of interposer 47 is attached by a stud 54 to an armature 55, which is also pivotally mounted on shaft 53.

A rod 56 is attached at the extreme lower end of armature 52 by means of a pivot stud 57. The right end of rod 56 is pivotally attached by means of a stud 58 to a pawl 59, which is the forward escapement pawl. Pawl 59 is pivotally mounted on a right-angle ram 60 of forward escapement rod 37 by means of stud 61.

Similarly, a rod 62 is affixed to the lower extremity of armature 55 at point 63. The right end of rod 62 is pivotally connected by means of a stud 83 to the upper end of a pawl 64, which is the reverse escapement pawl. Pawl 64 is pivotally mounted by means of a stud 65 to a right angle arm 66 of reverse escapement rod 39.

Associated with forward escapment pawl 59 is a forward escapement gear 67 which is fixedly mounted on a shaft 68, and associated with reverse escapement pawl 64 is a reverse escapement gear 69 which is oppositely mounted on shaft 68.

Pin feed wheel 6, previously mentioned, is fixedly mounted to shaft 68, and since gears 67 and 69 are fixedly mounted to shaft 68, normal counter-clockwise rotation of forward ratchet gear 67 will cause counter-clockwise rotation of pin feed wheel 6, and similarly, normal clockwise rotation of reverse ratchet gear 69 will cause clockwise rotation of pin feed wheel 6.

Fixedly mounted at the rear of shaft 68 is a detent wheel 74. Cooperating with this detent wheel 74, is a detent arm 75, which is pivotally mounted on a shaft 78, and which has a roller 76 rotatably mounted thereon. The detent arm is biased by means of a spring 77 toward the detent wheel 74, and the roller 76 is engaged with the detent wheel 74 at all times.

The purpose of the detent wheel and the cooperating detent elements is to insure that the shaft 68 and the pin feed wheel 6 rotate a certain fixed distance during each escapement, whether in the forward or in the reverse direction, thus insuring that spacing between successive character positions on the tape 1 is always the same. Another purpose of the detent elements is to dampen the rotation of the pin wheel 6, and shaft 68, thus insuring that the tape 1 will quickly come to a stand still condition after each escapement, so that accurate perforations may be made in the tape 1 when the selected punches 3 are actuated.

Mounted on a shaft 70 is an adjustable eccentric cam 71, which is associated with forward pawl 59, and which eliminates the tendency of ratchet gear 67 to overdrive during a forward escapement.

Similarly associated with reverse pawl 84 is an adjustable eccentric cam 72 which is mounted on a shaft 73, and which similarly eliminates overdrive of reverse ratchet gear 69 during a reverse escapement. Pawl 59 moves downwardly to drive ratchet gear 67 during a forward escapement and pawl 64 moves downwardly to drive ratchet gear 69 during a reverse escapement. As one of the pawls nears the end of its downward travel, its associated ratchet gear will become fully detented and this action will force or "jam" the pawl against the cam, thus preventing further motion of the ratchet wheel. Prevention of overdrive in this way insures accurate registration of the tape 1 in time for punching, which occurs shortly after escapement.

A suggested arrangement of some of the escapement elements as they might be placed on shaft 68 may be seen in Fig. 2 of the drawings. The shaft 68 would be supported in a freely rotatable manner by means of bearing members 79, 80, and 81.

Referring to Fig. 1, armature 52 is normally in a restored position against permanent magnet 96 and armature 55 is normally in a restored position against permanent magnet 97. Magnets 96 and 97 are mounted on a support plate 98 which is in turn mounted adjacent to armatures 52 and 55.

Mounted above interposers 44 and 47 on a bracket 85 is a forward escapement magnet 86 and a reverse escapement magnet 87. If a forward escapement is desired, forward escapement magnet 86 is energized through wires 88 and 89. The magnetic attraction of forward escapement magnet 86 will overcome the magnetic attraction of permanent magnet 96, and armature 52 will swing to the right toward magnet 86. It can be seen that this movement of armature 52 will result in positioning of interposer 44 to the right for engagement with bail 15 and it will also result in positioning pawl 59 into driving position with respect to ratchet gear 67. Interposer 44 is shown engaged with bail 15 and pawl 59 is shown in driving position in Fig. 1. With the mechanism set up as shown, rotation of drive shaft 10 and the resulting movement of eccentric 11 would accomplish a forward escapement.

In order to accomplish a reverse escapement, escapement magnet 87 is energized through leads 90 and 91. Electromagnet 87 will then attract armature 55 away from permanent magnet 97, thus positioning interposer 47 into an engagement with bail 15 and at the same time positioning reverse ratchet pawl 64 into driving position with respect to reverse ratchet 69, so that downward movement of the bail 15 will cause a reverse escapement.

Energization of the forward escapement magnet 86 or the reverse escapement magnet 87 may be selectively achieved through various control schemes which are known to those skilled in the art, and energization of either magnet 86 or magnet 87 is preferably done in a synchronous manner with respect to the mechanically driven elements of the invention, by providing the necessary pulses from circuit breakers mounted on the same shaft 10 which drives the eccentrics 11 and 12. The necessary circuit breakers and the control systems are not shown, but may take any number of forms known to those skilled in the art.

Referring to Fig. 4, it can be seen that a single upside down T-shaped escapement rod 92 might be used instead of the two escapement rods 37 and 39 which have been shown in the preferred embodiment. In that case, the rod extensions 60 and 66 would form the T and would be extensions of the single escapement rod 92. Pawls 59 and 64 would still be mounted on the respective extensions as shown and both interposers 44 and 47 would rest on the top of the single rod. All escapements would then be achieved by actuation of the single rod 92 and the type of escapement would be determined by which interposer-pawl combination had been positioned prior to actuation of the single rod. The inactive interposer and the inactive pawl would move along with the rod but both would be ineffective.

*Operation*

Operation of the present invention will be described in conjunction with Fig. 5, which is a sequence chart, and which presents a typical operation of the invention during four cycles of rotation of the drive shaft 10.

It will be assumed that the particular punching machine in which the preferred embodiment of the invention is used, is provided with circuit means for detecting either that an improper code combination has been punched in the tape 1, or that in case the actual perforations do form a proper combination, that the combination as punched does not agree with the code combination that was received by the machine and that should have been punched.

For illustrative purposes, whenever erroneous punching of a particular column occurs, the error will be detected right after the erroneous punching takes place and while the tape is being moved one space forward to the next character position. Immediately after the detection of the error, the tape 1 will be backspaced once so that the erroneous column is returned to the punching station. Elimination of the erroneous column is accomplished by actuating all punches so that all channels in the erroneous column are perforated. Thereafter, normal punching continues.

Figure 5:
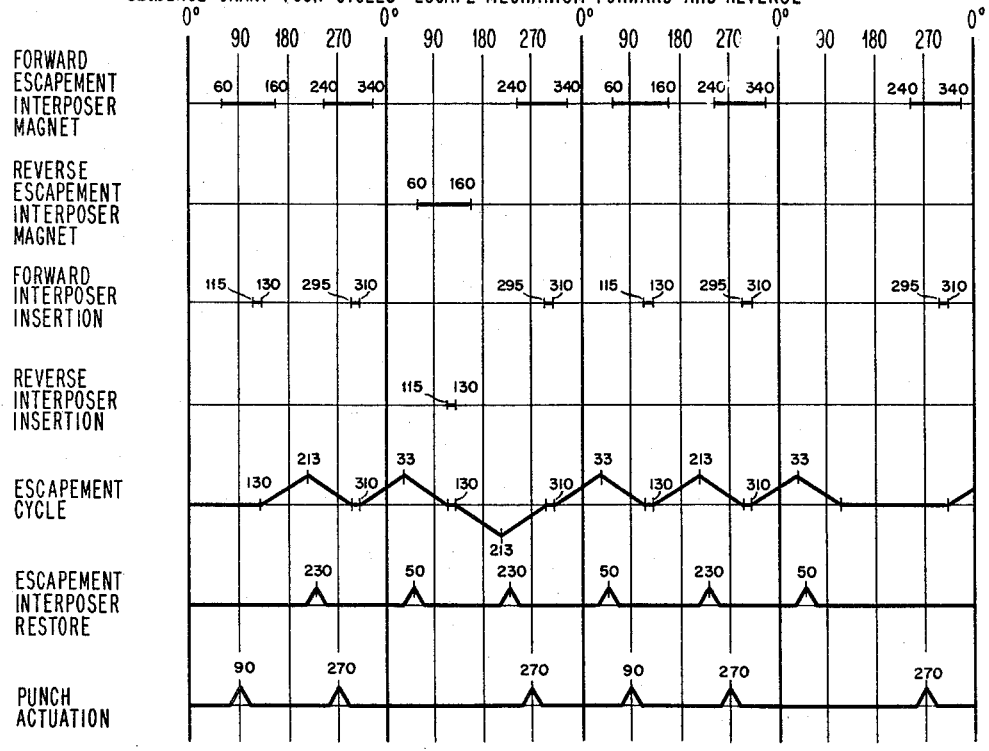
Fig. 5 is a sequence chart which illustrates a typical operation of the invention during four cycles of rotation of the driving means.

In Fig. 5, a cycle of the driving means is represented as being from zero degrees to 360 degrees. During this time, as a result of the doubling action previously described, two tape escapements may be accomplished, both in the forward direction or both in the reverse direction, or one escapement in each direction.

Suitable means would be provided, such as doubling means for achieving two actuations of the punches 3 during each cycle of the driving means. The sequence chart of Fig. 5 shows that actuation of the punches 3 may occur first at 90 degrees and again at 270 degrees of the cycle in any particular drive cycle.

Normally, it is desired to move the tape 1 one space in a forward direction after each actuation of the punches 3. In order to accomplish the first forward escapement in any cycle, the forward escapement magnet 86 is energized at 60 degrees of the cycle. The interposer knock-off 17 will not have moved out of the way in the embodiments shown until some time later, so that insertion of the forward interposer 44 under the bail 15 and positioning of the pawl 59 into driving relation with respect to ratchet gear 67 does not occur until 115°–130° of the cycle. Similarly, even though the magnet 86 is energized again at 240° of the cycle in order to accomplish a second forward escapement, insertion of interposer 44 and positioning of pawl 59 does not take place for this escapement until 295°–310° of the cycle.

The tape 1 is punched at 90 degrees of the first cycle shown in Fig. 5, and it is assumed that the punching is correct. Therefore, normal forward escapement occurs from 130 degrees to 213 degrees of the cycle. This can be seen by referring to the escapement cycle line, which indicates a forward escapement when drawn in an upward direction from the horizontal and which indicates a reverse escapement when drawn in a downward direction from the horizontal. After 213 degrees of the first cycle, the tape 1 is in proper position for punching of the next column. This punching occurs at 270 degrees of the cycle. A second forward escapement starts at 310 degrees of the first cycle and ends at 33 degrees of the second cycle.

Shortly after the second column of the tape 1 was punched at 270 degrees in the first cycle, it is assumed that an error was detected in the punching, and by the time the second forward escapement has been completed at 33 degrees of the second drive cycle, machine error correction circuits have been set up for causing deletion of the incorrectly punched column of the tape. Thus at 60 degrees of the second drive cycle, an impulse is directed to the reverse escapement interposer magnet in order to backspace the incorrectly punched column of the tape 1 again into punching position.

Insertion of the reverse escapement interposer 47 and engagement of the reverse pawl 64 occur in a manner similar to the insertion of the forward interposer 44 and engagement of the forward pawl 59. Accordingly, the reverse interposer insertion takes place at 115 degrees to 130 degrees of the second cycle and as a result of continued rotation of the drive shaft 10, and the actuation of the associated eccentrics and doubling linkages, a reverse escapement is accomplished from 130 degrees to 213 degrees of the second cycle.

In normal operation, the machine error correction circuits will prevent any actuation of the punches preceding this reverse escapement, and this can be seen by referring to the punch actuation line on the sequence chart in Fig. 5.

By 213 degrees of the second cycle, the erroneously punched column of the tape 1 has been returned to proper position at the punching station. The particular scheme employed herein for indicating erroneous tape columns is to cause all channels of the tape in the erroneous column to be perforated and this is assumed to take place at 270 degrees of the second cycle.

A forward escapement now occurs from 310 degrees of the second cycle to 33 degrees of the third cycle and the tape 1 is then in proper position at the punching station for another attempt to punch the code combination previously erroneously punched. This happens at 90 degrees of the third cycle and is followed by a normal forward escapement from 130 degrees to 213 degrees of the third cycle. This time the punching is assumed to be correct, and the succeeding column is punched at 270 degrees of the third cycle, and a forward escapement occurs from 310 degrees of the third cycle to 33 degrees of the fourth cycle.

It is assumed that no punching or escapement is initiated in the first half of the fourth cycle, and this may be so even though the drive shaft 10 is continuously rotating. It may be assumed that the column of the tape punched at 270 degrees of the third cycle was the last column of a tape "record," which ordinarily is comprised of characters of information related in some way, and it may be further assumed, that punching and escapement does not occur during the first half of the fourth cycle because the tape punching machine has sent an "end-of-record" signal back to the source machine and is waiting for a signal to commence punching the next record. The "go-ahead" signal is received and punching of the first column of the next record in the tape 1 is done at 270 degrees of the fourth cycle.

Reference to the sequence chart in Fig. 5 will disclose that the interposer knockoff 17 causes restoration of an engaged interposer and its related pawl at 50 degrees and again at 230 degrees in any particular cycle. Thus, an interposer and pawl which was engaged to cause an escapement ending at 213 degrees of a cycle is restored at 230 degrees of the cycle while an interposer and pawl that was engaged to cause an escapement ending at 33 degrees of a cycle is restored shortly thereafter at 50 degrees of the cycle.

While there have been shown and described and pointed out the fundamental novel features of the invention as applied to the embodiments disclosed, it will be understood that various omissions and substitutions and changes in the form and details of the invention and in its operation may be made by those skilled in the art without departing from the spirit of the invention. It is the intention therefore, to be limited only as indicated by the scope of the following claims.

What is claimed is:

1. An intermittent drive mechanism, comprising cyclically operable drive means, a driven shaft having a pair of ratchet gears oppositely mounted thereon, a first movable escapement rod having a first ratchet pawl mounted thereon associated with a first one of said gears, a second movable escapement rod proximately positioned to said first rod and having a second ratchet pawl mounted thereon associated with the second one of said gears, said rods being initially positioned so that each of the said pawls is in a non-engageable relation with respect to its associated ratchet gear, a centrally pivoted bail having a driving end thereof in proximity to a respective end of each of said rods but not in contact therewith, means actuated by said drive means for rocking the driving end of said bail toward said rods during each cycle, a first interposer movable on the bail end of said first rod into and out of driving engagement with said bail, a second interposer movable on the bail end of said second rod into and out of driving engagement with said bail, first electro-magnetically actuated set up means for moving said first interposer into driving engagement with said bail and for concurrently moving said first ratchet pawl into a driving position with respect to said first gear so that actuation of the said driving end of said bail toward said rods will cause the said first rod and its associated pawl to drive the said shaft in one direction, and second electro-magnetically actuated set up means for moving said second interposer into driving engagement with said bail and for concurrently moving said second ratchet pawl into driving position with respect to said second ratchet gear so that actuation of the said driving end of said bail toward said rods will cause the said second rod and its associated pawl to drive the said shaft in the opposite direction.

2. The mechanism of claim 1 wherein means are provided for moving an actuated interposer out of driving engagement with said bail and for concurrently moving an actuated ratchet pawl out of driving position with respect to its associated ratchet gear and wherein means are provided for restoring an actuated rod to its initial position.

3. An intermittent drive mechanism, comprising cyclically operable drive means, a bail actuated during each cycle of said drive means, a driven shaft, a pair of similarly cut ratchet gears fixedly and oppositely mounted on said shaft, a reciprocally movable escapement rod normally having one end proximately positioned in non-engageable relation to the driving end of said bail and normally having the other end commonly adjacent to said ratchet gears, a first ratchet pawl connected to a first armature and pivotally mounted on the said ratchet-gear end of said rod and movable into and out of engagement with a first one of said ratchet gears, a second ratchet pawl connected to a second armature and pivotally mounted in an opposite manner to said first pawl on the ratchet gear end of said rod and movable into and out of engagebent with the second one of said ratchet gears, a first interposer connected to said first armature and a second interposer connected to said second armature, each of which is positioned on the said bail-end of said rod and each of which is movable into and out of an engageable relation with respect to said bail, means for causing actuation of said first armature, thereby moving said first interposer on said rod into engagement with said bail and thereby concurrently moving said first pawl into engagement with said first ratchet gear, so that actuation of said bail will cause rotation of said shaft in one direction, and means for causing actuation of said second armature, thereby moving said second interposer on said rod into engagement with said bail and thereby concurrently moving said second ratchet pawl into engagement with said second ratchet gear, so that actuation of said bail will cause rotation of said shaft in the opposite direction.

References Cited in the file of this patent

UNITED STATES PATENTS

| | | |
|---|---|---|
| 1,704,904 | Schaub | Mar. 12, 1929 |
| 2,005,807 | Smith | June 25, 1935 |
| 2,150,014 | Walter | Mar. 7, 1939 |
| 2,558,953 | Henninger et al. | July 3, 1951 |
| 2,648,385 | De Boo | Aug. 11, 1953 |